United States Patent [19]

Yamamoto et al.

[11] Patent Number: 4,698,476
[45] Date of Patent: Oct. 6, 1987

[54] AUTOMATIC WIRE FEEDER FOR AN ELECTRICAL DISCHARGE MACHINING APPARATUS INCLUDING COMBINED CLEANING FLUID AND WORKING FLUID SUPPLY SYSTEMS

[75] Inventors: Masahiro Yamamoto; Takeshi Yatomi, both of Aichi, Japan

[73] Assignee: Mitsubishi Denki Kabushiki Kaisha, Tokyo, Japan

[21] Appl. No.: 574,093
[22] PCT Filed: Apr. 28, 1983
[86] PCT No.: PCT/JP83/00130
  § 371 Date: Jan. 5, 1984
  § 102(e) Date: Jan. 5, 1984
[87] PCT Pub. No.: WO83/03991
  PCT Pub. Date: Nov. 24, 1983

[30] Foreign Application Priority Data

May 6, 1982 [JP] Japan .................. 57-75740

[51] Int. Cl.⁴ .......................... B23H 7/02; B23H 1/10
[52] U.S. Cl. .................. 219/69 W; 219/69 D
[58] Field of Search ............. 219/69 W, 69 E, 69 M; 226/91; 15/316 R, 317; 204/206, 224 M

[56] References Cited

U.S. PATENT DOCUMENTS

| | | | |
|---|---|---|---|
| 2,427,588 | 9/1947 | Burnett | 219/69 E |
| 2,526,423 | 10/1950 | Rudorff | 219/69 W |
| 3,116,889 | 1/1964 | Lasch, Jr. et al. | 226/91 |
| 3,485,138 | 12/1969 | Staehle | 15/316 R |
| 3,493,710 | 2/1970 | Moore | 219/69 W |
| 3,752,170 | 8/1973 | Murbach | 15/316 R |
| 4,027,355 | 6/1977 | Mead et al. | 15/316 R |
| 4,054,044 | 10/1977 | Wareing et al. | 219/69 W |
| 4,250,371 | 2/1981 | Haug et al. | 219/69 W |
| 4,350,864 | 9/1982 | Janicke et al. | 219/69 W |
| 4,383,161 | 5/1983 | Corcelle | 219/69 W |
| 4,465,915 | 8/1984 | Corcelle | 219/69 W |

FOREIGN PATENT DOCUMENTS

| | | | |
|---|---|---|---|
| 755491 | 8/1980 | Japan | 219/69 W |
| 157430 | 12/1980 | Japan | 219/69 W |
| 56-76337 | 6/1981 | Japan | 219/69 W |
| 56-82134 | 7/1981 | Japan | 219/69 W |
| 56-89436 | 7/1981 | Japan | 219/69 W |
| 163843 | 12/1981 | Japan | 219/69 D |
| 57-1624 | 1/1982 | Japan | 219/69 D |
| 57-96734 | 6/1982 | Japan | 219/69 M |

Primary Examiner—A. D. Pellinen
Assistant Examiner—Geoffrey S. Evans
Attorney, Agent, or Firm—Sughrue, Mion, Zinn, Macpeak & Seas

[57] ABSTRACT

A device for feeding an electrode wire 2 automatically from a wire supply reel 1 to a work hole 77 in the material 38 to be machined, and therefrom to a recovery system for the electrode wire includes a cleaning device for injecting a fluid against a guide member 40 for the electrode wire to blow away dust or any other contaminant matter to ensure that the electrode can be successfully supplied for a long period of time.

17 Claims, 22 Drawing Figures

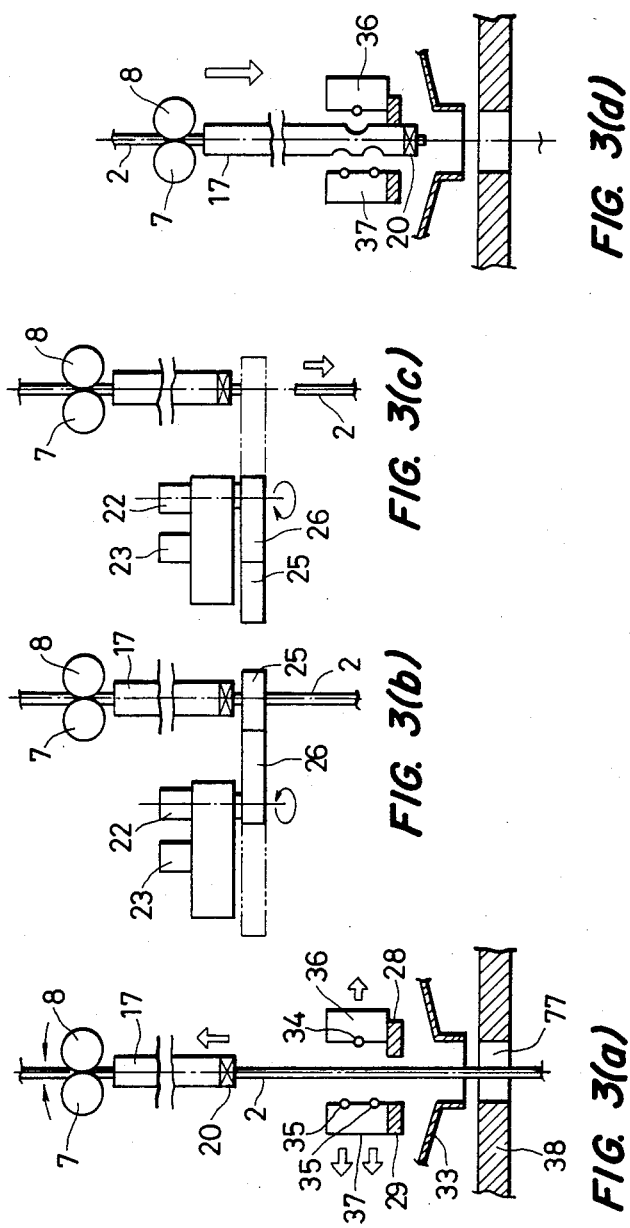

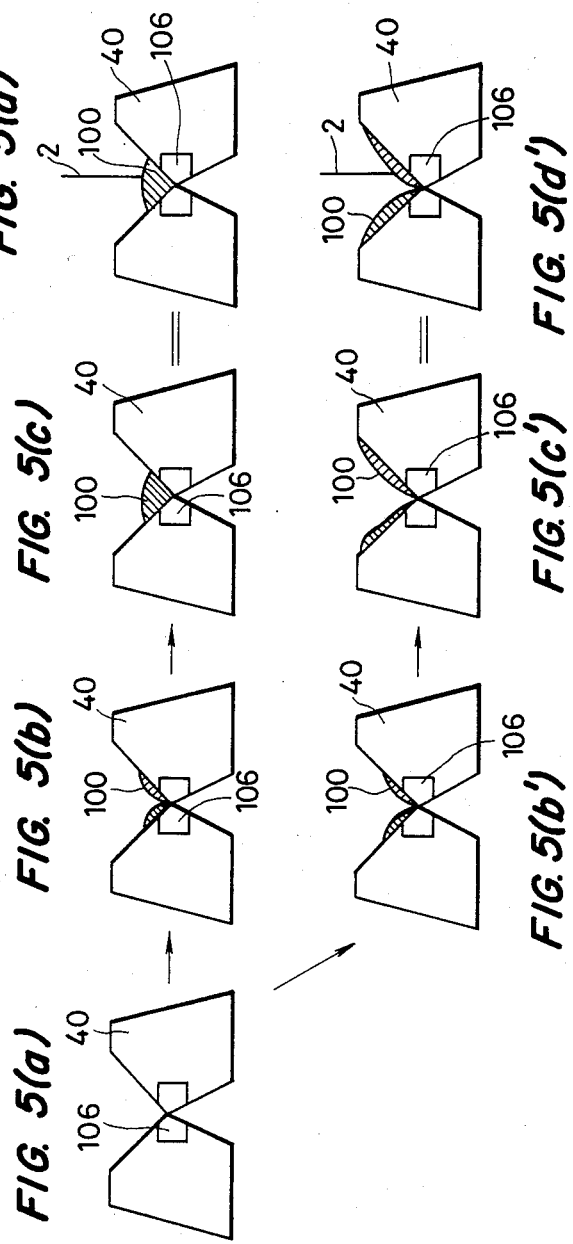

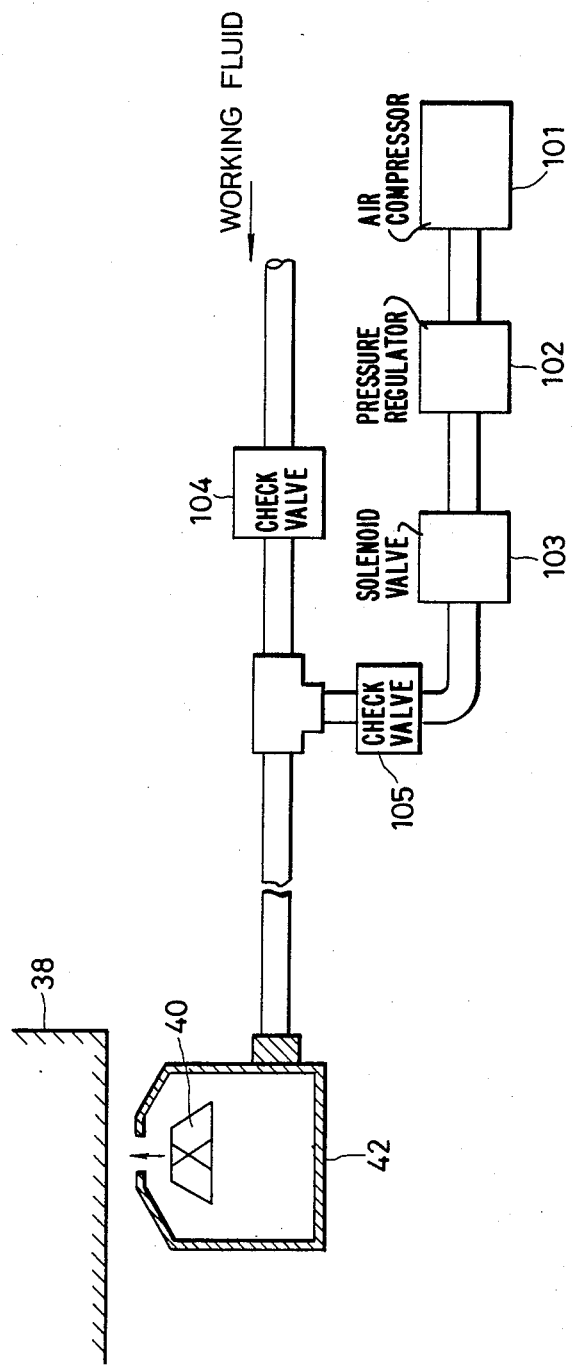

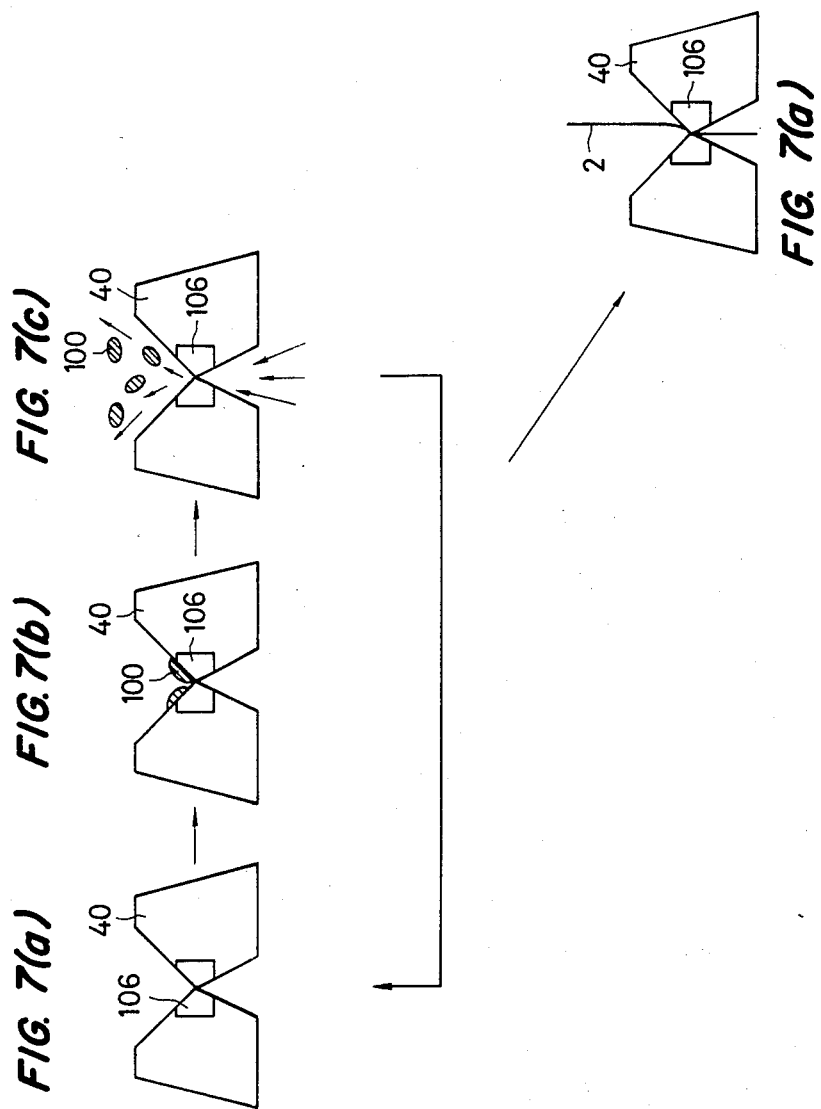

AUTOMATIC WIRE FEEDER FOR AN ELECTRICAL DISCHARGE MACHINING APPARATUS INCLUDING COMBINED CLEANING FLUID AND WORKING FLUID SUPPLY SYSTEMS

TECHNICAL FIELD

This invention relates to an automatic wire feeder for a wire cut electrical discharge machining apparatus. More particularly, it is concerned with an automatic wire feeder for a wire cut electrical discharge machining apparatus which reduces the load bearing on the wire during its automatic feeding, and ensures the successful automatic feeding of the wire for a long period of time.

BACKGROUND ART

A conventional automatic wire feeder for a wire cut electrical discharge machining apparatus is shown in FIG. 1.

A wire supply reel 1 is connected to a torque motor (not shown), so that a torque for reverse rotation may be given to the reel to provide a brake force which prevents the sagging of an electrode wire 2. A brake roller 3 is connected to an electromagnetic brake (not shown). A holding roller 4 is held against the brake roller 3 by a spring. The electrode wire 2 is held between the brake roller 3 and the holding roller 4, and is maintained at a constant tension without slipping. Numeral 5 denotes a direction changing roller. A positioning die 6 has an inside diameter which is slightly larger than the diameter of the electrode wire 2. A pinch roller 7 for wire feeding is rotated by a pinch roller motor 10 mounted on a vertically movable plate 9, only when the wire is automatically fed. A holding roller 8 for wire feeding is held by a spring against the roller 7. The electrode wire 2 is held between the rollers 7 and 8 so that it may be fed downwardly without slipping. The positioning die 6 holds the electrode wire 2 in position between the rollers 7 and 8.

The vertical movement of the vertically movable plate 9 is effected by the rotation of a ball screw 13 connected to a motor 11 by a coupling 12. The vertically movable plate 9 is provided on its reverse side not visible in the drawing with a ball nut which converts the rotation of the ball screw 13 to a linear vertical motion. The ball screw 13 has one end supported on a motor mounting base 15 attached to a vertical guide 14, while the other end of the ball screw 13 is supported by a bearing 16.

The vertical guide 14 guides the vertical movement of the vertically movable plate 9 so that it may accurately perform linear vertical motion.

A pipe guide 17 is secured to the vertically movable plate 9 by a guide fixing member 18. The pipe guide 17 is adapted for vertical movement with the vertically movable plate 9, and is supported by a bearing 19 so that it may not swing during its vertical movement. The pipe guide 17 has one end to which a die guide 20 is attached for supporting the electrode wire 2. The bearings 16 and 19, and the vertical guide 14 are attached to a fixed plate 21.

A motor 22 for cutting and a motor 23 for arm rotation are secured to a case 24. A wire cutting station comprises a wire cutter 25, a cutting arm 26, and a tray 27 for receiving any waste produced when the wire is cut. The case 24 and the tray 27 are mounted on the fixed plate 21. The case 24 and the wire cutter 25 will hereinafter be described in further detail.

The pipe guide 17 is held against a V-grooved plate 28 by a holding plate 29. The V-grooved plate 28 has a V-groove in which the pipe guide 17 is held in position. The V-grooved plate 28 is secured to a box 30 mounted on the fixed plate 21. The box 30 has a nozzle 33 through which a jet of a working fluid 31 is supplied to a working station 32.

The pipe guide 17 has three notches through which three pins 34 and 35 are brought into contact with the electrode wire 2 to supply electricity thereto. The electricity supplying pin 34 is secured to a movable plate 36 which is moved to the right so that the pin 34 may not contact the pipe guide 17 when the pipe guide is vertically moved. The pins 35 are secured to a movable plate 37, and movable to the left with the holding plate 29. The material 38 to be worked is placed on a table 39.

A lower die guide 40 and a lower electricity supplying die 41 are both secured to a box 42 which is supported on a lower arm 43. The box 42 has a nozzle 78 through which a jet of working fluid 31 is supplied to the working station 32, and a guide nozzle 44 through which the electrode wire 2 is guided.

The electrode wire 2 leaving the guide nozzle 44 is moved between a lower belt 47 extending between a pair of belt rollers 45 and 46, and a lower roller 48, and guided into a horn-shaped pipe 49. The electrode wire 2 passes through a recovery pipe 50, is moved between a recovery belt 53 extending between a pair of recovery rollers 51 and 52 and a recovery roller 54, and collected into a coil in a recovery box 55 to be thrown away. The belt rollers 45 and 46, the lower roller 48, the recovery rollers 51, 52 and 54, the horn-shaped pipe 49, etc. constitute a recovery system. The electrode wire 2 is fed at a speed which is variable by the rotation of a motor having a reduction gear, and mounted on the reverse side of the recovery roller 54. The lower roller 48 and the recovery roller 54 are connected to each other by a belt on the reverse side thereof.

The rollers 48 and 54 are identical in diameter, and rotate synchronously. The electrode wire 2 is maintained in frictional contact with the lower roller 48 and the recovery roller 54, and is thereby pulled without slipping for collection into the recovery box 55.

The system 22–26 for cutting the electrode wire 2 will now be described with reference to FIG. 2.

A cutter 56 for cutting the electrode wire 2 is secured to a movable bar 58 by a screw 57. A supporting bar 59 is secured to one end of the movable bar 58 to hold the electrode wire 2 against movement when it is cut, and carries rubber 60 which prevents slipping of the wire. A holding plate 61 is secured to the cutting arm 26 by a screw 62, and a rubber member 64 is bonded to the holding plate 61 to prevent slipping of the wire. If the movable plate 58 is moved to the left, the electrode wire 2 is cut between the cutter 56 and the holding plate 61, and held between the rubber members 60 and 64. The right end portion of the movable bar 58 is threaded, and a compression spring 65 surrounds the bar and is secured by a nut 66. The movable bar 58 is moved horizontally if an eccentric cam 67 makes a half turn. FIG. 2 shows the eccentric cam 67 in its rightmost position, and the movable bar 58 is held in its rightmost position by the force of the spring 65. If the cam 67 makes a half turn into its leftmost position, the bar 58 and the nut 66 are moved to their leftmost position, whereby the electrode wire is cut between the cutter 56 and the holding plate 61.

The rotation of the cutting arm 26 will now be explained.

If the motor 23 is rotated, a gear 69 attached to its output shaft causes the rotation of a gear 70. The gear 70 is secured to an arm rotating bar 71 which is connected to the cutting arm 26. The bar 71 is supported by bearings 72 and 73. If the motor 23 makes substantially half a turn, the arm 26 is rotated by 180°. The position of the arm 26 shown in FIG. 2 and the position which it takes when it is rotated by 180° are defined by, for example, limit switches.

The rotation of the eccentric cam 67 will now be explained.

A bar 74 for rotating the eccentric cam is rotatably disposed in the arm rotating bar 71. The bar 74 has a lower end to which the eccentric cam 67 is secured, and which is smoothly rotatable in a bearing 75. The upper end of the bar 74 is connected to the motor 22 by a coupling 76. If the motor 23 is rotated to rotate the cutting arm 26 by 180°, the electrode wire 2 is positioned between the cutter 56 and the holding plate 61, as the relationship between the nut 66 and the cam 67 remains unchanged. If the motor 22 is, then, rotated by 180°, the movable bar 58 is moved toward the holding plate 61, whereby the electrode wire 2 is cut as hereinabove described. Then, the motor 23 for arm rotation is rotated by 180° in the opposite direction, while the motor 22 for cutting is not rotated, and then, the motor 22 for cutting is rotated by 180° in the opposite direction, so that the positional relationship shown in FIG. 2 may be restored.

If the electrode wire 2 is cut by the rotation of the motor 23 while the motor 22 is not rotated, the electrode wire 2 on the side of the lower die guide 40 slips down between the rubber members 60 and 64, and is collected in the recovery box 55. If the electrode wire 2 is cut before the wire cut electrical discharge machining operation is started, the electrode wire 2 on the side of the lower die guide 40 is thrown away into the tray 27 if the motor 23 is rotated.

The cutting of the electrode wire 2 will now be described with reference to FIG. 3.

FIG. 3(a) shows the electrode wire 2 extending through a work hole 77 which is provided in the material 38 to be worked. This situation is shown in FIG. 1, and occurs when wire cut electrical discharge machining is performed at a plurality of discontinuous points in a single piece of the material 38 to be worked, or when such machining work is finished. If the pipe guide 17 is raised as shown by an arrow in FIG. 3(a), the movable plates 36 and 37 carrying the electricity supplying pins 34 and 35 and the holding plate 29 to which the movable plate 37 is attached are moved as shown by arrows. The pipe guide 17 has an upper limit of movement.

The pinch roller 7 and the holding roller 8 move up with the pipe guide 17, and turn idly as shown by arrows in FIG. 3(a).

The V-grooved plate 28 is stationary, and the pipe guide 17 is vertically moved in contact with the plate 28. The nozzle 33 is also stationary. The die guide 20 has a clearance about the electrode wire 2 so that when the pipe guide 17 is moved upward, the die guide 20 can also move upward, while rubbing the wire 2. The lower end of the die guide 20 which is shown in FIG. 3(a) will hereinafter be called the cutting position.

FIG. 3(b) shows the cutting arm 26 which has been rotated by 180° into the cutting position, whereby the electrode wire 2 is positioned in the cutter 25. The operation of the motor 22 for cutting and the motor 23 for arm movement have already been described with reference to FIG. 2. The pinch roller 7 and the holding roller 8 are at a standstill. A one-way clutch (not shown) is provided for the pinch roller 7 to prevent its rotation in the direction opposite to that of the arrow in FIG. 3(a).

FIG. 3(c) shows the electrode wire 2 which has been cut, and the cutting arm 26 which has been rotated by 180° in the opposite direction into its original position, as hereinbefore described with reference to FIG. 2. The lower portion of the electrode wire 2 which has been cut from its upper portion is collected into the recovery box 55, as the recovery roller 54 shown in FIG. 1 starts to rotate upon sensing the rotation by 180° of the motor 22 as hereinbefore described with reference to FIG. 2.

FIG. 3(d) shows the position which the apparatus takes after it has cut the electrode wire 2. After the wire 2 has been cut as shown in FIG. 3(c), the pipe guide 17 moves down to the position shown in FIG. 3(d). The movable plates 36 and 37 remain in their retracted positions, and the pipe guide 17 is in the same position as in FIG. 1. The position of the lower end of the die guide 20 at this moment will hereinafter be called the normal position.

There is no upward removal of the electrode wire 2 from the die guide 20 during the downward movement of the pipe guide 17, as the wire is held between the pinch roller 7 and the holding roller 8, and as the one-way clutch prevents the reverse rotation of the pinch roller 7. The situation shown in FIG. 3(d) indicates the end of cutting. The electromagnetic brake connected to the brake roller 3 in FIG. 1 has an extremely lowered brake force throughout the cutting operation hereinabove described with reference to FIGS. 3(a) to 3(d).

The insertion of the electrode wire 2 into the work hole 77 and the lower die guide 40 will now be explained with reference to FIG. 4.

The series of operations including the insertion of the electrode wire 2 into the work hole 77 and the lower die guide 40, and its delivery into the recovery box will hereinafter be called and the insertion of the electrode wire 2. FIG. 4(a) shows the initial stage of wire insertion which is equal to the position shown in FIG. 3(d). The upper die guide 20, the work hole 77 and the lower die guide 40 are vertically in alignment with one another.

The pipe guide 17 is lowered into the work hole 77 so that the upper die guide 20 may face the lower die guide 40, as shown in FIG. 4(b). The lower end of the upper die guide 20 at this moment is at what will hereinafter be called the lower limit. This position is detected by, for example, a limit switch.

The pinch roller 7 and the holding roller 8 are rotated to advance the electrode wire 2, as shown in FIG. 4(c). FIG. 4(c) shows the electrode wire 2 extending through the lower die guide 40. The electrode wire 2 passing through the lower die guide 40 is moved through the lower electricity supplying die 44 into the recovery box 55, as shown in FIG. 1. The pipe guide 17 is raised to its original position as shown in FIG. 4(d), and the movable bodies 36 and 37 and the holding plate 29 are moved in the direction of arrows to cause the electricity supplying pins 34 and 35 to contact the electrode wire 2, whereupon the insertion of the electrode wire 2 is finished.

If the electrode wire 2 is advanced as shown in FIG. 4(c), it reaches the lower die guide 40. The lower die guide 40 has a tapered recess at its top, as shown in FIG. 5(a). The electrode wire 2 is guided by the tapered surface, and fed through a die 106 disposed at the bottom of the recess and formed from diamond, sapphire, or the like. This tapered portion is exposed to the working fluid and the dust 100 produced when the material 38 to be worked is worked by the electrical discharge machining apparatus. The dust 100 has a particle size varying depending on the working conditions, but settles, since each individual particle has a mass. The dust 100 increases in proportion to the working time. It gathers in the tapered portion of the lower die guide 40 as shown at (b) to (c), or (b') to (c') in FIG. 5. The dust 100 covers the die 106 as shown in FIG. 5(c), or gathers on the tapered surface, while not adhering substantially to the die 106, as shown in FIG. 5(c'). If the die 106 is covered by the dust 100 as shown in FIG. 5(c), the electrode wire 2 cannot be fed through the die 106, as shown in FIG. 5(d). If the tapered surface is covered by the dust 100 as shown in FIG. 5(d'), the electrode wire 2 cannot be fed through the die 106 unless it is so guided as not to contact the tapered surface, even if the dust 100 does not cover the die 106. The electrode wire 2 is caught by the dust 100, and fails to reach the die 106.

The tapered portion and the die 106 in the lower die guide 40 are further contaminated as the working time increases, and it eventually becomes impossible to feed the electrode wire 2 automatically, resulting in the inability to continue the machine operation.

SUMMARY OF THE INVENTION

This invention has been made to eliminate the drawbacks of the conventional device as hereinabove pointed out, and provides an automatic wire feeder for a wire cut electrical discharge machining apparatus which feeds an electrode wire automatically from a wire supply reel into a work hole in the material to be machined, and therefrom into a recovery system, characterized by including a device for supplying a fluid to an electrode wire guide system to blow away dust, etc. to thereby reduce the load bearing on the wire and ensure that the wire can automatically be fed for a long period of time.

BRIEF DESCRIPTION OF THE DRAWINGS

FIGS. 3(a) to (d) are a series of views illustrating the cutting operation by the cutting system shown in FIG. 2;

FIG. 5 is a view showing the drawbacks of the conventional device shown in FIG. 1;

FIG. 6 is a block diagram showing a device embodying this invention; and

FIGS. 7(a) to (d) are a series of views illustrating the advantages of the device shown in FIG. 6.

BEST MODE OF CARRYING OUT THE INVENTION

Figure 1:
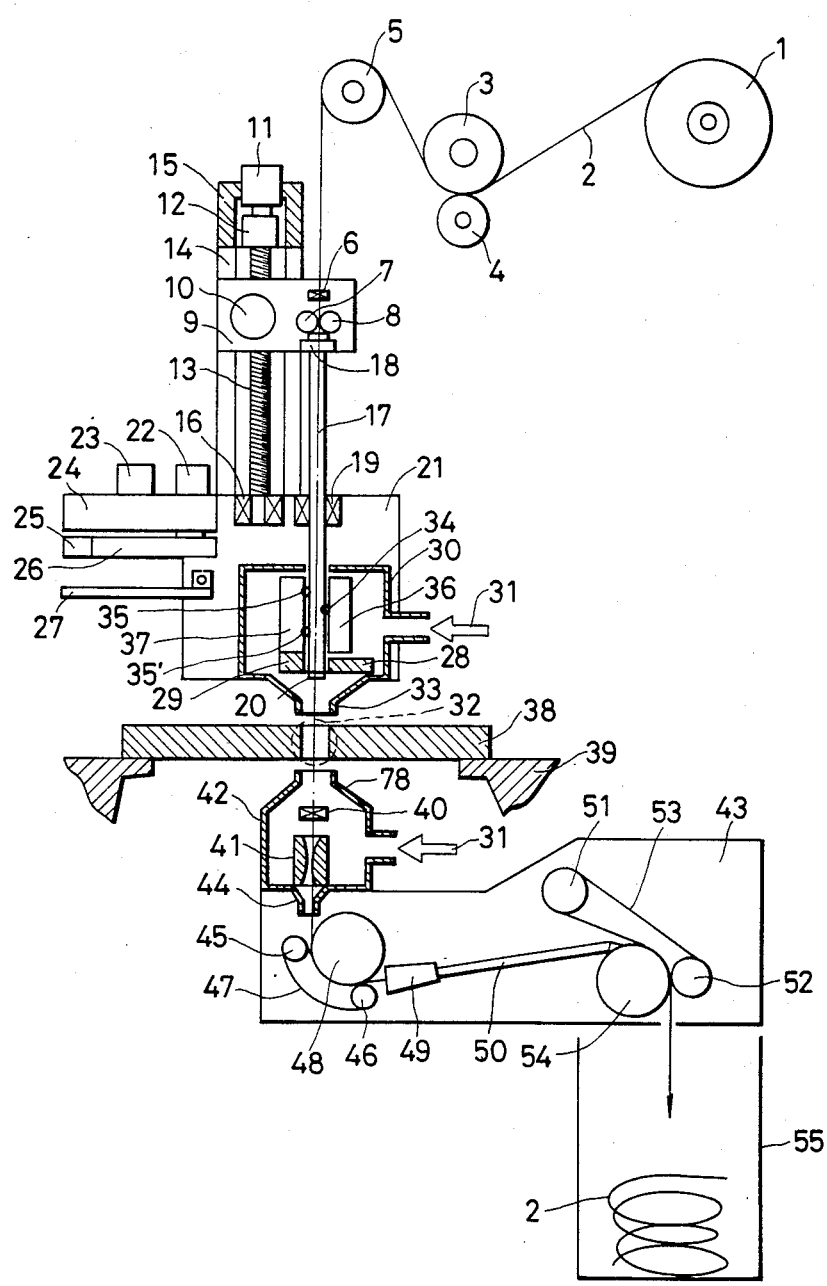
FIG. 1 is a view showing the arrangement of an automatic wire feeder for a conventional wire cut electrical discharge machining apparatus.
Figure 2:
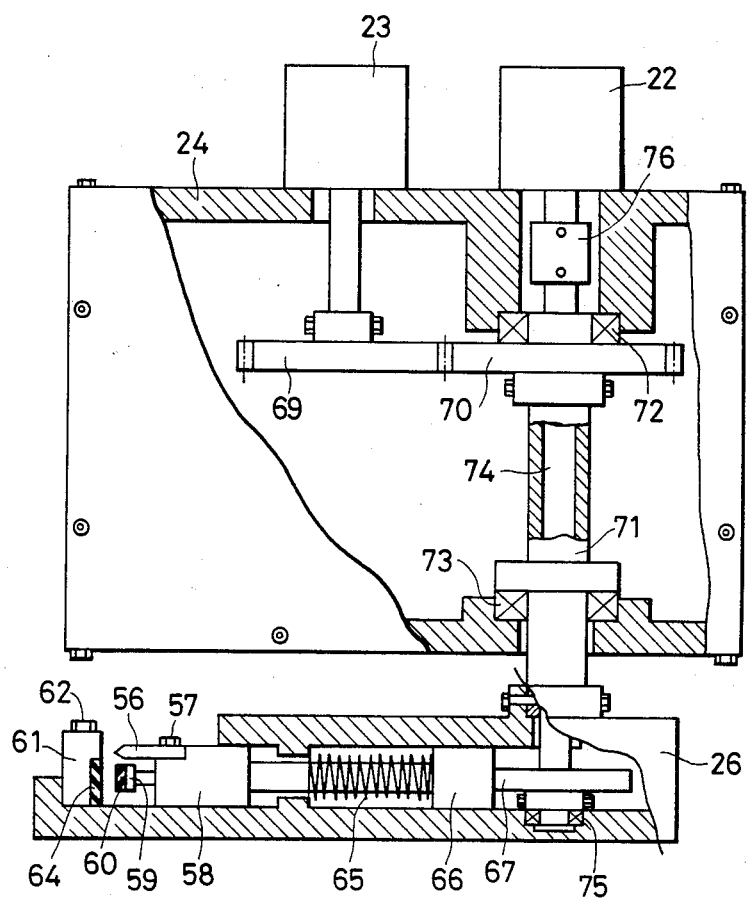
FIG. 2 is an enlarged view, partly in section, of the cutting system in the conventional device shown in FIG. 1.
Figure 4D:
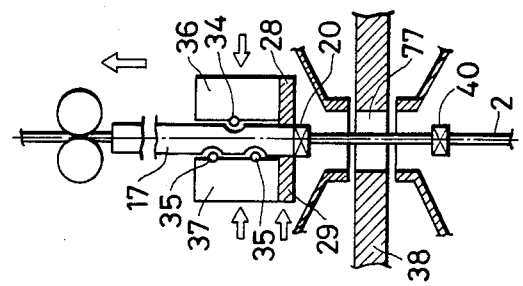
FIGS. 4(a) to (d) are a series of views illustrating the insertion of the electrode wire in the conventional device shown in FIG. 1.
Figure 4C:
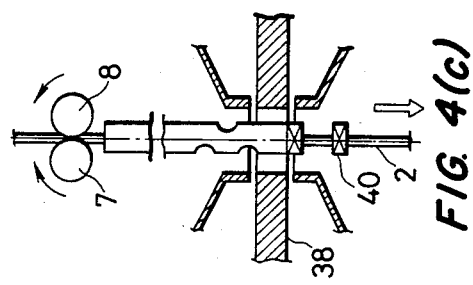
Figure 4B:
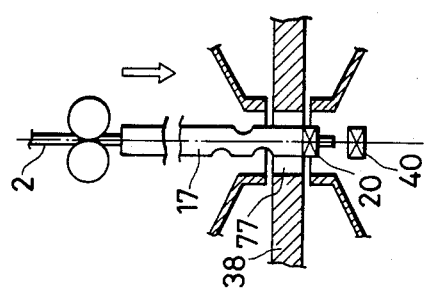
Figure 4A:
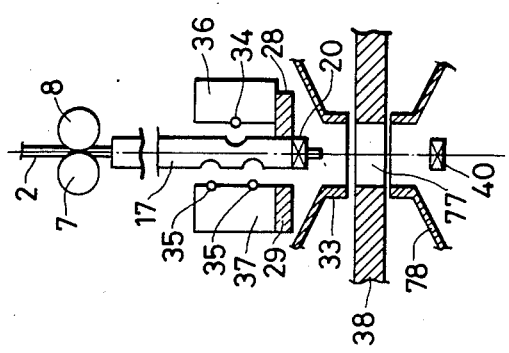

The invention will now be described by way of example with reference to the drawings. FIG. 6 is a block diagram showing by way of example a cleaning apparatus embodying this invention, with which the inventor of this invention has conducted a series of experiments. The device includes a solenoid valve 103 connected to a working fluid supply passage so that dust 100 may be removed from the tapered portion and the die 106 of the lower die guide 40. A check valve 105 is provided between the solenoid valve 103 and the fluid passage. The solenoid valve 103 is designed so as to function when the wire cut electrical discharge machining apparatus having an automatic wire feeder has finished its machining work, or when the automatic wire feeder starts to feed the wire. Compressed air produced by a compressor 101, etc. has a constant pressure as obtained by a regulator 102, etc., and enters the solenoid valve 103. As soon as the solenoid valve 103 opens, the compressed air flows through the check valve 105 and a T-shaped joint into the box 42, and upwardly through the lower die guide 40 in the direction of the arrow. A check valve 104 is provided between the T-shaped joint and the source of supply of the working fluid to prevent any back flow of compressed air into the pump for the working fluid when the solenoid valve 103 has opened. The check valve 105 prevents any back flow of the working fluid into the compressor. The compressor 101, the regulator 102, the solenoid valve 103 and the check valves 104 and 105 constitute the cleaning device.

The use of air immediately after the machining work has been finished, and when the automatic wire feeder starts to feed the wire, i.e., the timing of the cleaning operation, is due to the discovery by the inventor that the dust 100 is easy to remove when wet, but very difficult to remove when dry. Machining work was performed using the lower die guide 40 as shown in FIG. 7(a). The machining work was stopped at certain intervals of time, and the wire was subsequently automatically fed. The state of FIG. 7(b) thus obtained is equivalent to what is shown in FIGS. 5(b) and (b'). When the device of this invention was employed, the dust 100 was easily blown away by the air supplied in the direction of the arrows immediately after the machining work was stopped, as shown in FIG. 7(c). The state of FIG. 7(a) was, therefore, restored. Since the lower die guide 40 and the die 106 were always in their initial condition when the automatic wire feeder started to feed the wire; the electrode wire 2 could be easily fed, as shown in FIG. 7(d).

The results of experiments indicating the percentage of successful insertion of the electrode wire are shown in TABLE 1 below.

TABLE 1

| | Percentage of successful insertion of electrode wire | | | | |
|---|---|---|---|---|---|
| Working time (h) | 0 | 2 | 4 | 16 | 32 |
| % when no air was injected | 95 | 91 | 83 | 76 | 65 |
| % when air was injected | 95 | 95 | 95 | 95 | 95 |

TABLE 1 teaches that a high percentage of successful wire insertion can be maintained for a long period of time if air is injected through the lower die guide immediately after the machining work is stopped, and when the automatic wire feeder starts to feed the wire.

Although an air pressure of 0.1 kg/cm² was used in the above described experiments, this can, of course, be raised to achieve still better results. In the experiments, a partly common conduit was used for the working fluid and the compressed air. This arrangement facilitates the provision of the device according to this invention.

The device of this invention can be incorporated into an existing wire cut electrical discharge machining apparatus to periodically clean the lower die guide to thereby facilitate the manual insertion of an electrode wire, as well as its automatic insertion. This brings about a drastic reduction in the time and trouble associated with wire insertion.

It is possible to additionally supply air to the upper die guide, as well as to the lower die guide, to clean the upper die guide as well. Although air was used by way of example, it is, of course, possible to use any other equally effective fluid, such as water.

We claim:

1. In an electrical discharge machining apparatus of the type including a lower die guide disposed below a conductive material to be machined, the improvement comprising means for selectively injecting one of a working fluid and a cleaning fluid in the vicinity of said lower die guide, said means for injecting said cleaning fluid including means for pressurizing said cleaning fluid and means for directing said cleaning fluid against a bottom of said lower die guide to remove dust from said lower die guide, said means for injecting said cleaning fluid being rendered operable upon at least one of: (a) the completion of an electrical discharge machining operation, and (b) when an electrode wire of said electrical discharge machining apparatus begins to be fed.

2. An apparatus as set forth in claim 1, further including an upper die guide, and mean for injecting said cleaning fluid against said upper die guide to remove dust from said upper die guide.

3. An apparatus as set forth in claim 1, wherein said means for injecting said cleaning fluid includes a regulator which supplies said fluid at a constant pressure.

4. An apparatus as claimed in claim 1, wherein said means for selectively injecting further includes a first flow path for said working fluid, a second flow path for said cleaning fluid, junction means for joining said first and second flow paths to form a third flow path leading to the vicinity of said lower die guide, and valve means for preventing working fluid in said first and third flow paths from entering said second flow path and for preventing cleaning fluid in said second and third flow paths from entering said first flow path.

5. An apparatus as set forth in claim 1, wherein said cleaning fluid is air.

6. An apparatus as set forth in claim 5, wherein said air has a pressure of at least 0.1 kg/cm².

7. An apparatus as set forth in claim 1, wherein said working fluid is a working fluid for electrical discharge machining.

8. An apparatus as set forth in claim 7, wherein said working fluid is water.

9. An as set forth in claim 4, wherein said lower die guide is located in a box having a nozzle through which said working fluid is injected upwardly against a machining station.

10. An apparatus as set forth in claim 9, wherein said means for injecting said cleaning fluid is connected via said third flow path to said box and said nozzle.

11. An apparatus as set forth in claim 10, wherein said second flow path comprises an air compressor, a regulator for imparting a constant pressure to the air supplied by said compressor, a solenoid valve, and a check valve comprising a part of said valve means, said compressor, regulator, solenoid valve and check valve being positioned in series.

12. An apparatus as set forth in claim 11, wherein said solenoid valve is rendered operable upon one of: (a) the completion of an electrical machining operation, and (b) when said electrode wire of said machining apparatus starts to be fed.

13. An apparatus as set forth in claim 12, wherein said valve means further includes a second check valve disposed between said junction means and said first flow path for said working fluid, and a source of supply of said working fluid.

14. An apparatus as set forth in claim 4, wherein said lower die guide includes a tapered portion defining a central depression, a die of said die guide being disposed in the bottom of said depression.

15. An apparatus as set forth in claim 14, wherein said die is formed from one of diamond and sapphire.

16. An apparatus as claimed in claim 1, wherein said means for injecting said cleaning fluid directs said cleaning fluid against the die of said lower die guide.

17. In an electrical discharge machining apparatus of the type including a lower die guide disposed below a conductive material to be machined, the improvement comprising means for selectively injecting one of a working fluid and a cleaning fluid in the vicinity of said lower die guide, said means for injecting said cleaning fluid including means for pressurizing said cleaning fluid and means for directing said cleaning fluid against a bottom of said lower die guide to remove dust and debris from said lower die guide, said means for selectively injecting further including a first flow path for said working fluid, a second flow path for said cleaning fluid, junction means for joining said first and second flow paths to form a third flow path leading to the vicinity of said lower die guide, and valve means for preventing working fluid in said first and third flow paths from entering said second flow path and for preventing cleaning fluid in said second and third flow paths from entering said first flow path, said second flow path including an air compressor, a regulator for imparting a constant pressure to the air supplied by said compressor, a solenoid valve, and a check valve constituting a part of said valve means, said compressor, regulator, solenoid valve and check valve being arranged in series.

* * * * *